United States Patent
Neumann et al.

(10) Patent No.: US 10,830,204 B2
(45) Date of Patent: Nov. 10, 2020

(54) COUNTERWEIGHT SYSTEM FOR BALANCED HUB WIND TURBINE BLADE INSTALLATION

(71) Applicant: General Electric Company, Schenectady, NY (US)

(72) Inventors: Ulrich Werner Neumann, Greenville, SC (US); Ryan Michael Sunyak, Greenville, SC (US); Alexander William Vossler, Greenville, SC (US); Darren John Danielsen, Simpsonville, SC (US); Santiago Tomas, Barcelona (ES)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 16/117,016

(22) Filed: Aug. 30, 2018

(65) Prior Publication Data

US 2019/0085818 A1    Mar. 21, 2019

(30) Foreign Application Priority Data

Sep. 15, 2017    (EP) ..................... 17382609

(51) Int. Cl.
    *F03D 1/06*      (2006.01)
    *F03D 13/10*     (2016.01)
(52) U.S. Cl.
    CPC ........... *F03D 1/0658* (2013.01); *F03D 13/10* (2016.05); *F05B 2220/706* (2013.01);
    (Continued)
(58) Field of Classification Search
    CPC ........................ F03D 1/0658; F05B 2230/60
    See application file for complete search history.

(56) References Cited

U.S. PATENT DOCUMENTS

2004/0253109 A1    12/2004  Wobben
2015/0275854 A1*  10/2015  Canedo Pardo ........ F03D 80/00
                                                        29/889

FOREIGN PATENT DOCUMENTS

DE    102009011603 A1 *  9/2010  ............. F03D 13/10
DE    102009011603 A1     9/2010
(Continued)

OTHER PUBLICATIONS

Wuerthele english translation (Year: 2010).*
European Search Report issued in connection with corresponding EP application 17382609.0 dated Mar. 26, 2018.

*Primary Examiner* — Jason L Vaughan
*Assistant Examiner* — Amanda Kreiling
(74) *Attorney, Agent, or Firm* — Dority & Manning, P.A.

(57) ABSTRACT

A counterweight system for mounting a rotor blade on a balanced rotatable hub of a wind turbine is disclosed. The rotatable hub can have at least one blade root region configured to receive a blade root of the rotor blade, and also have a pitch system configured to rotate the rotor blade around a pitch axis. The counterweight system can have at least one support structure having a proximal end spaced apart from a distal end with the proximal end mountable to at least one blade root region of the rotatable hub. The at least one counterweight mass can be at least partially filled with fluid and coupled to the distal end of the at least one support structure. The at least one support structure can be arranged substantially parallel to the pitch axis such that the pitch system rotates the counterweight mass about the pitch axis.

16 Claims, 9 Drawing Sheets

(52) U.S. Cl.
CPC ..... *F05B 2230/60* (2013.01); *F05B 2240/221* (2013.01); *F05B 2240/912* (2013.01); *F05B 2260/74* (2013.01); *F05B 2260/90* (2013.01)

(56) References Cited

FOREIGN PATENT DOCUMENTS

| | | |
|---|---|---|
| EP | 2924284 A1 | 9/2015 |
| KR | 101400205 B1 | 5/2014 |
| KR | 101607691 B1 | 3/2016 |

\* cited by examiner

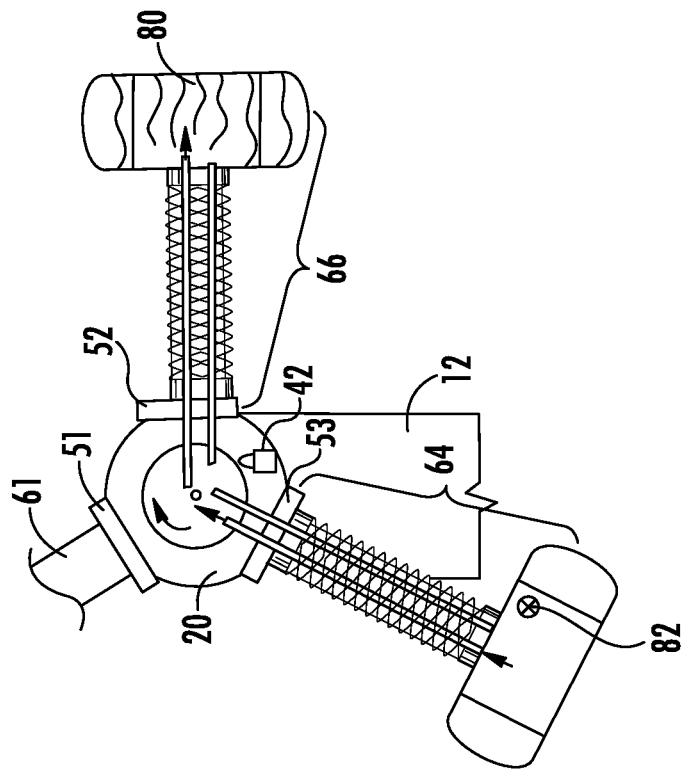
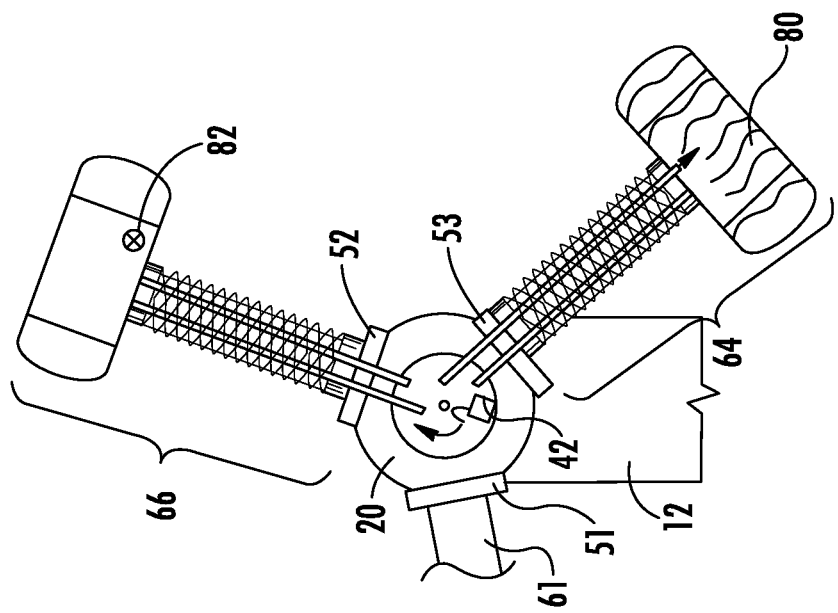

COUNTERWEIGHT SYSTEM FOR BALANCED HUB WIND TURBINE BLADE INSTALLATION

FIELD OF THE INVENTION

The present subject matter relates generally to wind turbines and, more particularly, to counterweight systems that can be fluid-filled and methods for installing individual blades on a balanced rotatable hub using the counterweight systems.

BACKGROUND OF THE INVENTION

Generally, modern wind turbines are used to supply electricity into the electrical grid. Wind turbines generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

During installation, one or more blades are to be mounted to the wind turbine hub. The hub generally comprises a plurality of annular mounting flanges with openings and/or a plurality of surfaces prepared for attachment, lifting or manipulation. The blade can comprise a plurality of fasteners, such as bolts, or pins or studs at its blade root. During installation, these fasteners are to be fitted into the openings in the mounting flanges.

The blades may be installed in a variety of ways, e.g. in a substantially vertical manner or substantially horizontally or at other inclined angles. Particularly, in offshore wind turbines, mounting a blade from above the hub may be very complicated, or at least require an enormous crane and jack-up barge. Such an installation method may thus be very expensive and depending on the depth of the sea, the blade size and hub height may simply be impossible.

It is known to hoist a complete rotor assembly, i.e. the hub with blades, and mount it to e.g. the nacelle. But in order to mount a complete rotor assembly, a large surface area is required, which is typically not available in the case of offshore wind turbines.

It is further known to mount an incomplete rotor assembly on the nacelle, e.g. the hub with two blades and subsequently, mount the remaining blade. In these cases, the rotor with the two blades is normally mounted with the two blades pointing upwards, i.e. "bunny ears" configuration. There is thus no need for rotating the wind turbine rotor as the third blade can be vertically mounted from below. However, in order to be able to perform these operations, the prevailing wind speed has to be below a predetermined value for a prolonged period time. The period of time depends on the expected length of the installation step and a safety factor to be taken into account. During certain seasons, windows of several hours in which the wind does not reach the predetermined value are rarely available. In practice, this may mean that personnel and maintenance equipment including e.g. expensive cranes and jack-up barges may be in stand-by during days or even weeks. This can represent an enormous cost.

It is known to mount each of the plurality of blades substantially horizontally or substantially vertically. This means that individual installation steps may require less time and/or may be performed at higher winds, thus increasing the time windows available for installation. However, such methods require rotation of the hub between the mounting of one blade and another. In order to correctly position the hub, torque is required for rotating the wind turbine rotor after mounting one blade in order to mount the next one. When not all blades have been mounted onto the hub, the hub is not balanced, so that the weight of one or more blades has to be carried upwards when rotating the hub. The corresponding torque may thus be very high. In this method, individual blades are mounted in the horizontal position after which the rotor needs to be rotated by 120 degrees to get the next axis into position to install the next blade. This process has to be repeated twice to finish the installation. Rotating the hub is traditionally done by back-driving the drive train and thereby utilizing the ratio of the gearbox. As blades have become longer and heavier, the combined static load, imposed by blade mass and center-of-gravity location, plus the aerodynamic loads, impose a torque on the gearbox which exceeds the extreme loads the gearbox is designed to withstand. The trivial solution would be to design the gearbox to withstand these loads but that adds cost and weight to the wind turbine.

The torque to rotate the hub may also be delivered using the gearbox (when present) with an external power supply for rotating the rotor. Such a system may be used in combination with a locking pin in a rotor lock for maintaining the rotor in a desired position for installation. This is not possible in case of directly driven wind turbines as no gearbox is provided between rotor and generator. Even though the generator may be suitable for operating as a motor, it will generally not be able to deliver the required torque to rotate the hub, especially when the hub is unbalanced, i.e. when at least one blade, but not all the blades have been mounted.

It is an object of the present disclosure to provide methods and systems that at least partially reduce one or more of the aforementioned drawbacks leading to improved methods of installing individual wind turbine blades especially suitable for direct drive wind turbines and offshore direct drive wind turbines.

BRIEF DESCRIPTION OF THE INVENTION

Aspects and advantages of the invention will be set forth in part in the following description, or may be obvious from the description, or may be learned through practice of the invention.

In one aspect, a counterweight system for mounting a rotor blade on a balanced rotatable hub of a wind turbine is disclosed. The rotatable hub can be mounted to a nacelle and have at least one blade root region configured to receive a blade root of the rotor blade, and also have a pitch system configured to rotate the rotor blade around a pitch axis. The counterweight system can have at least one support structure having a proximal end spaced apart from a distal end with the proximal end mountable to at least one blade root region of the rotatable hub. The at least one counterweight mass can be coupled to the distal end of the at least one support structure. The at least one support structure can be arranged substantially parallel to the pitch axis such that the pitch system rotates the counterweight mass about the pitch axis.

In another aspect, a wind turbine is disclosed having a tower, a nacelle mounted atop the tower, a generator coupled to a main frame within the nacelle, and a counterweight system described above.

In another aspect, a method of individually mounting at least one blade to a balanced rotatable hub of a wind turbine using at least one counterweight system described above is disclosed as having the steps of: engaging a rotor lock to stop rotation of a balanced rotatable hub; installing a first blade onto a first blade root region of the balanced rotatable hub, the first blade positioned in a horizontal direction; disengaging the rotor lock so that the rotor freely rotates the rotatable hub to position the first blade in a vertical downward direction; installing a first counterweight system onto a third blade root region of the rotatable hub, the first counterweight system containing no fluid; installing a second counterweight system onto a second blade root region of the rotatable hub, the second counterweight system containing no fluid; at least partially filling the first counterweight system with fluid until the rotatable hub becomes balanced and rotates a counterweight mass centroid of the second counterweight system past the vertical upward direction on the opposing side of the first blade; at least partially filling the second counterweight system with fluid while simultaneously at least partially emptying the first counterweight system to freely rotate the balanced rotatable hub until the second counterweight system reaches a horizontal position; engaging the rotor lock to stop rotation of the balanced rotatable hub, uninstalling the second counterweight system from the second blade root region; installing a second blade onto the empty second blade root region of the rotatable hub, the second blade positioned in a horizontal direction; filling the first counterweight system with fluid until the rotatable hub is balanced; rotating the balanced rotatable hub until the first counterweight system is in a horizontal position; engaging the rotor lock to stop rotation of the balanced rotatable hub; uninstalling the first counterweight system from the third blade root region; installing a third blade onto the empty third blade root region of the rotatable hub, the third blade positioned in a horizontal direction; and disengaging the rotor lock so that the balanced rotor is free to rotate with all three blades attached.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 6-16 illustrate an embodiment of method steps for individually mounting at least one blade to a balanced rotatable hub using at least one counterweight system and removable fluid.

Figure 1:
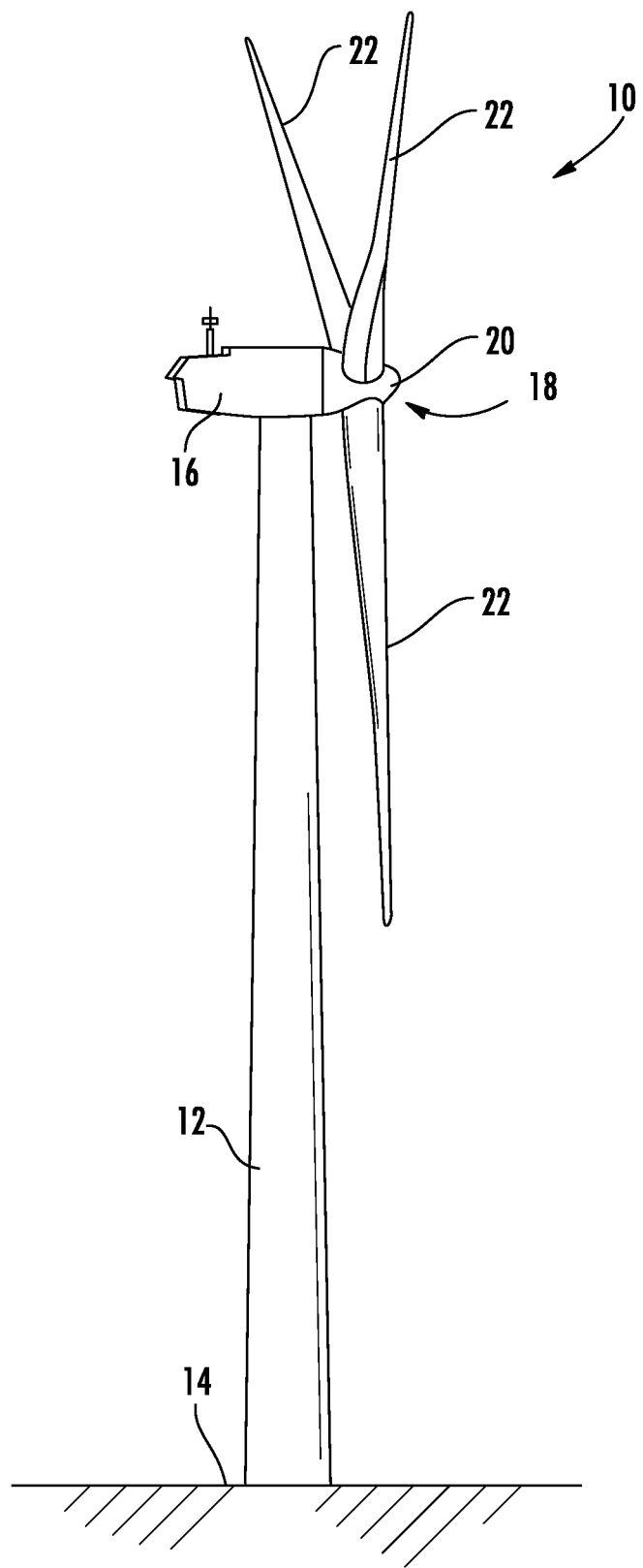
FIG. 1 illustrates a perspective view of one embodiment of an onshore wind turbine of conventional construction.

Repeat use of reference characters in the present specification and drawings is intended to represent the same or analogous features or elements of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses a method and device for single blade installation on a wind turbine which eliminates the need for an unbalanced rotor turning gear. Using a counterweight system and counterweight mass, with the ability to at least partially fill the counterweight mass with a fluid and/or solid mass portions, and also rotate an asymmetric counterweight fluid mass about the pitch axis with the pitch system, can increase or decrease the weight, and thus the torque, on the hub to rotate the rotor during assembly or maintenance. The method for mounting blades provides the ability to rotate an unbalanced rotor without the use of an unbalanced rotor turning gear, thereby eliminating the strain and load on the drive train. Most of the driving is done by gravity utilizing variable and rotatable fluidic or solid mass in the counterweight system. This method is particularly of value in direct drive machines, which are inherently difficult to perform rotation of the large rotors.

Increasing tower heights and blade masses make a full rotor lift (hub and three blades) more and more impractical or even impossible. Therefore, the rotor has to be assembled in the air by first lifting the hub to the machine head and then installing each blade individually. The most convenient and safe position for a blade to be hoisted is in the horizontal position with the suction side down, sometimes using lifting frames. After the first blade is installed, the hub needs to be rotated through 120 degrees to position the next axis of the second blade.

Referring now to the drawings, FIG. 1 illustrates a perspective view of one embodiment of a wind turbine 10 of conventional construction. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
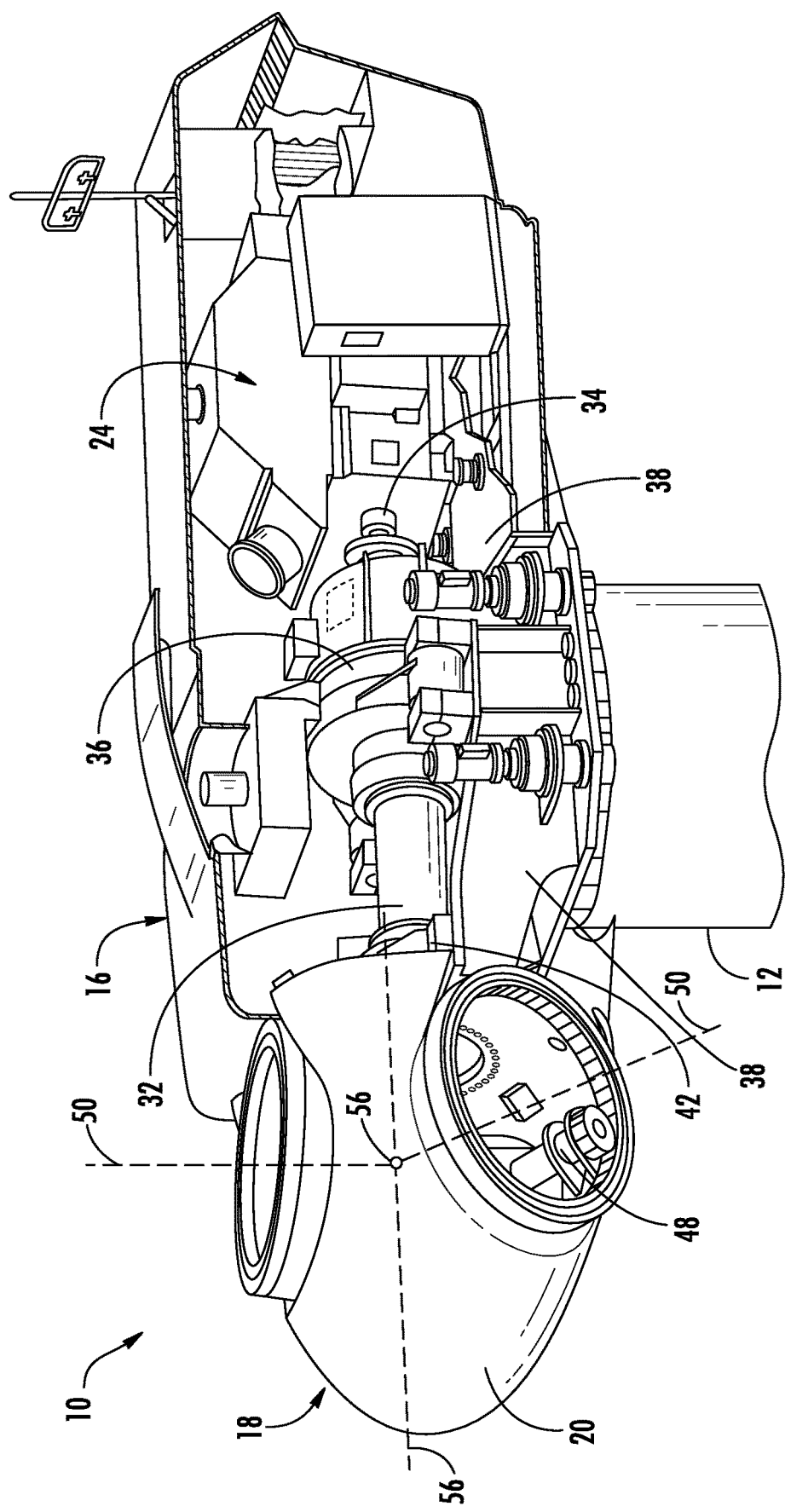
FIG. 2 illustrates an internal perspective of a nacelle having a gear-driven drive train and rotatable hub.

Referring now to FIG. 2, a simplified, internal view of one embodiment of a nacelle 16 of a wind turbine 10 is illustrated. As shown, a generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. A pitch system 48 is positioned inside the rotatable hub 20 to individually rotate each of the rotor blades 22 about their respective pitch axis. The rotor shaft 32 may, in turn, be rotatably coupled to a generator shaft 34, sometimes referred to as the high speed shaft (HSS), of the generator 24 through a gearbox 36 having a gearbox output shaft. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 (HSS), and thus, the generator 24.

Figure 3:
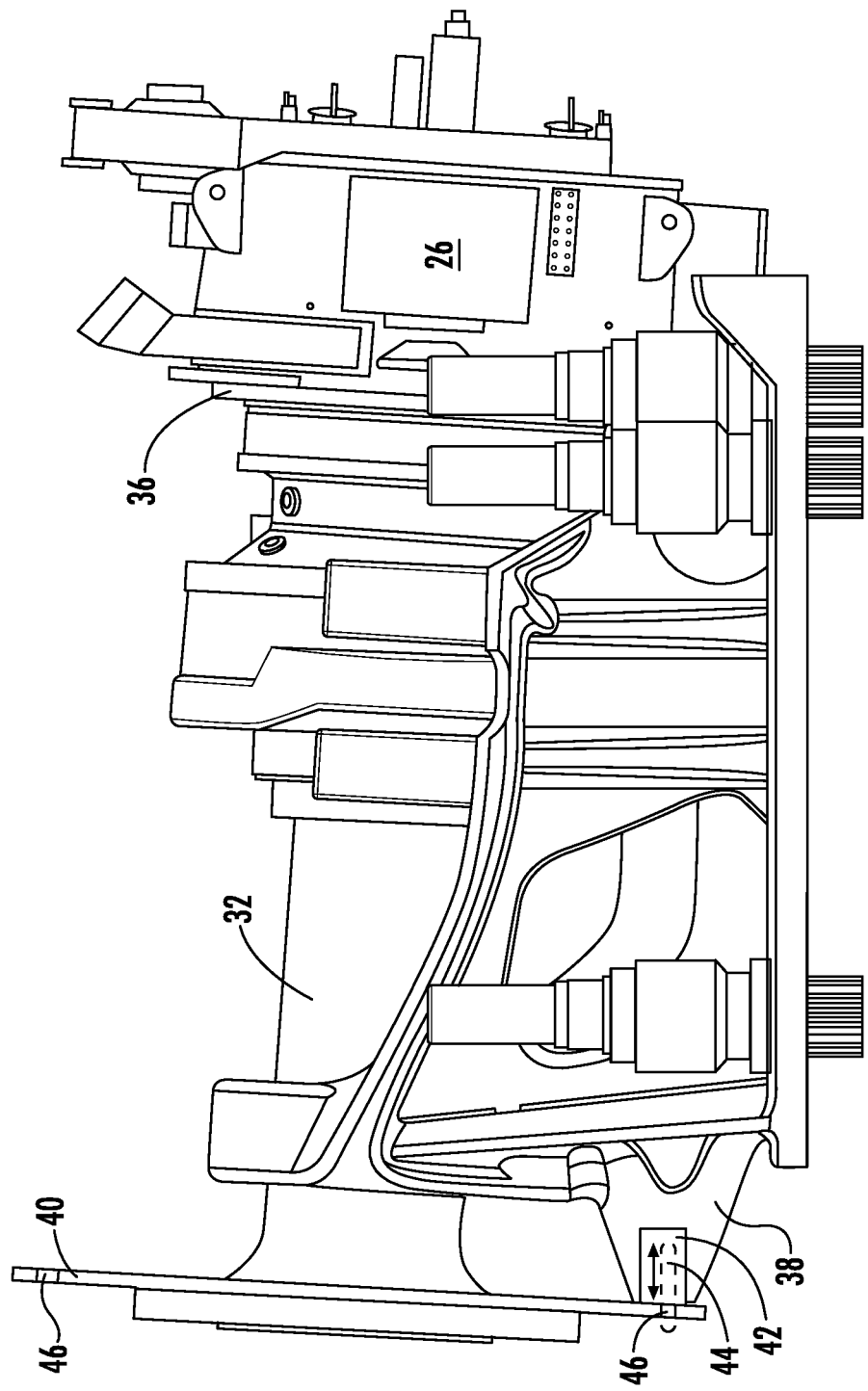
FIG. 3 illustrates an internal side view of a portion of one embodiment of the nacelle.

FIG. 3 is an internal side view of a portion of the nacelle 16 in accordance with an embodiment of the present invention. The bedplate assembly 38 includes the rotor shaft 32 with a first end coupled to the rotatable hub 20 of the wind turbine 10 (as shown in FIG. 1). The rotor shaft 32 also includes an opposite end coupled to the gearbox 36. A rotor locking disk 40 is coupled to first end of the rotor shaft 32. The rotor locking disk 40 defines a plurality of openings 46 each extending through rotor locking disk 40 and positioned circumferentially about rotor locking disk 40. The bedplate assembly 38 further includes a rotor lock 42 at a lower section of the bedplate assembly 38 and towards the front section. The rotor lock 42 is configured as a low speed rotor lock to stop and lock the rotation of the rotor shaft 32 and the rotor blades 22 (shown in FIG. 1) by insertion of the pointed portion 44 of the rotor lock 42 within any of the multiple openings 46 in the rotor locking disk 40 during blade mounting and maintenance of the wind turbine 10.

Figure 4:
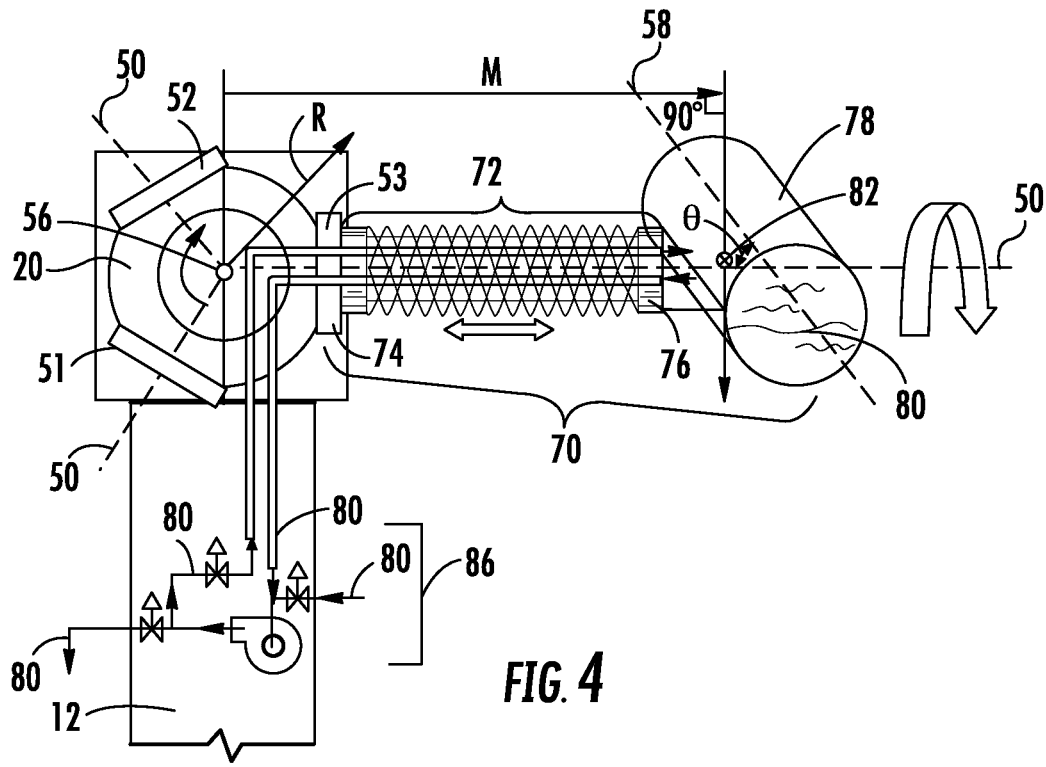
FIGS. 4 and 5 illustrate front views of embodiments of counterweight systems installed on rotatable hubs.
Figure 5:
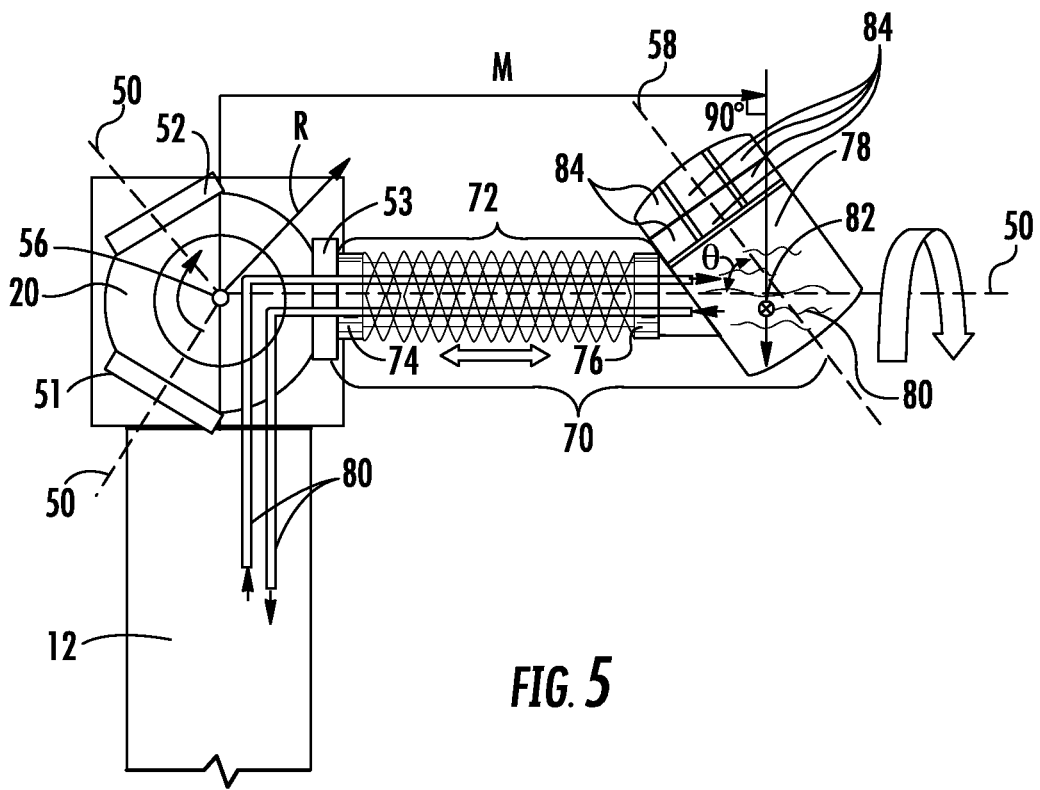
Figure 6:
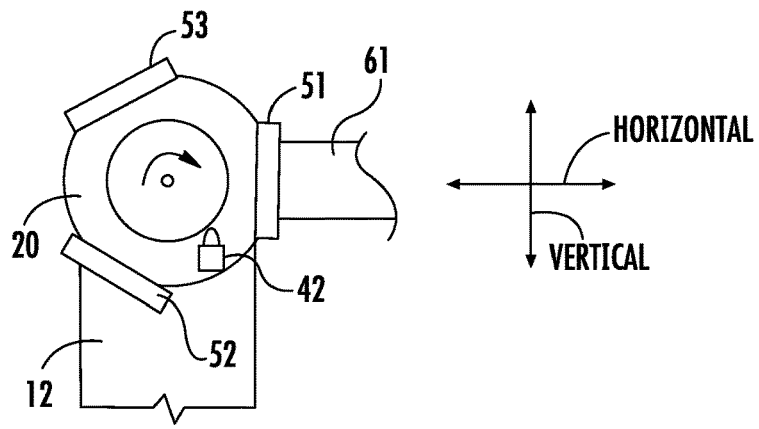
Figure 7:
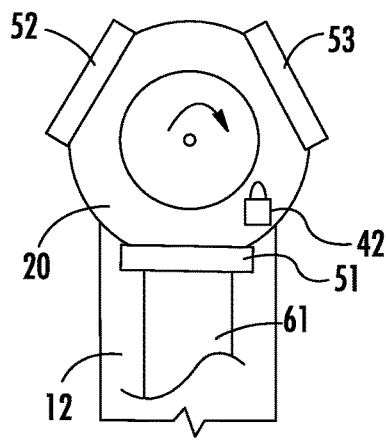
Figure 8:
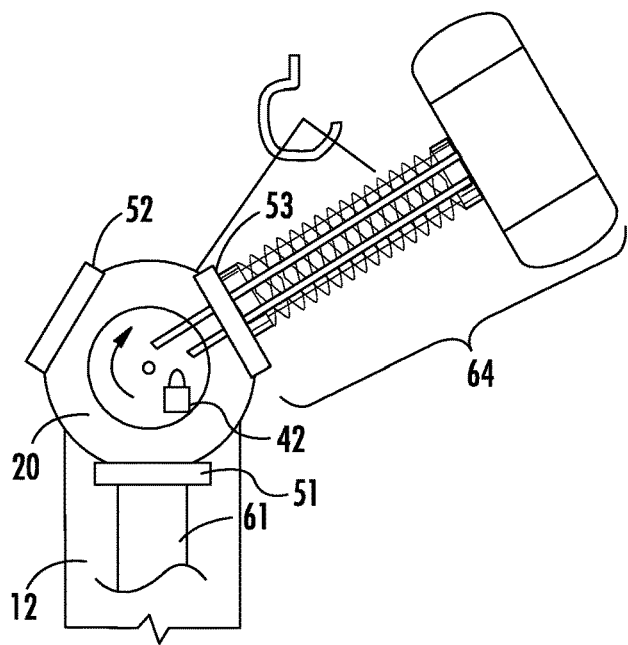
Figure 10:
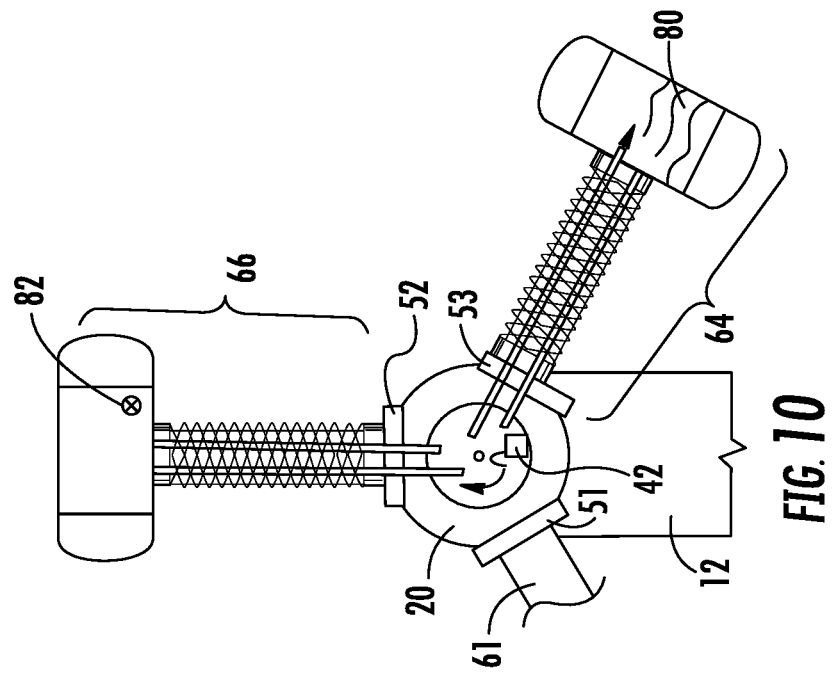
Figure 9:
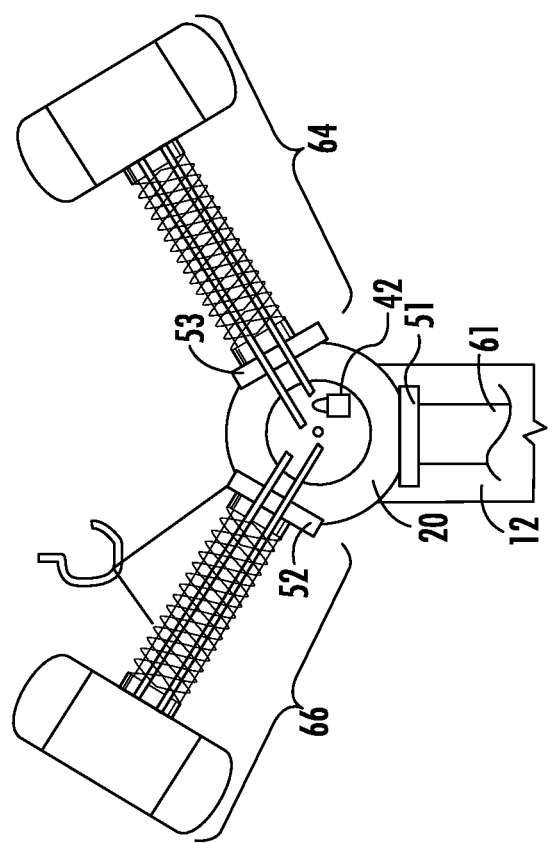
Figure 14:
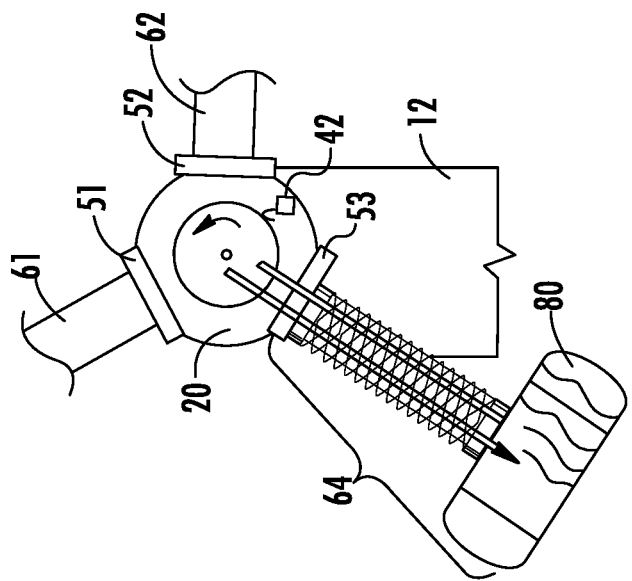
Figure 13:
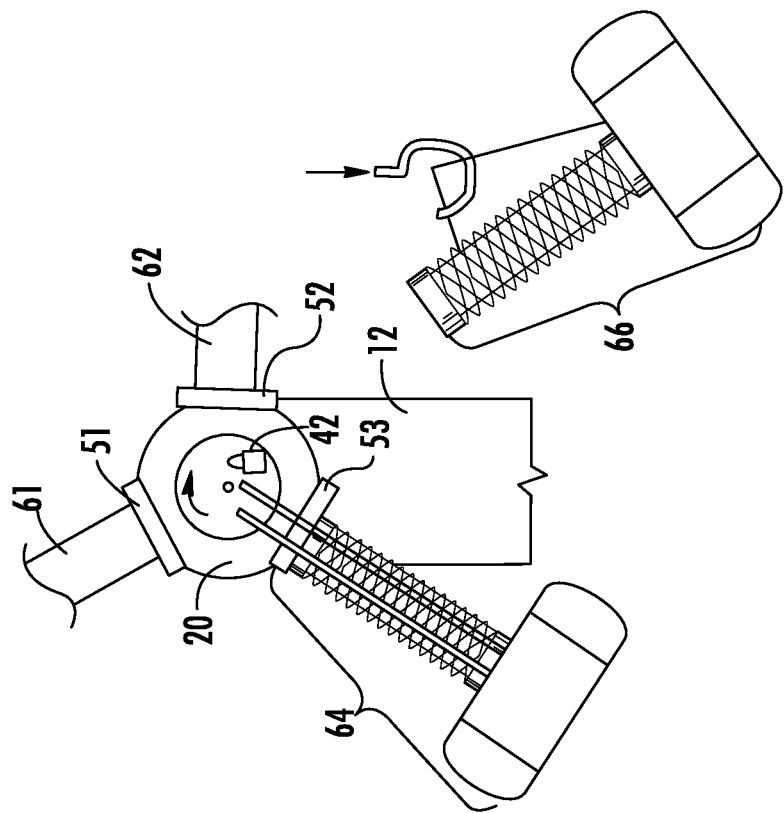
Figure 15:
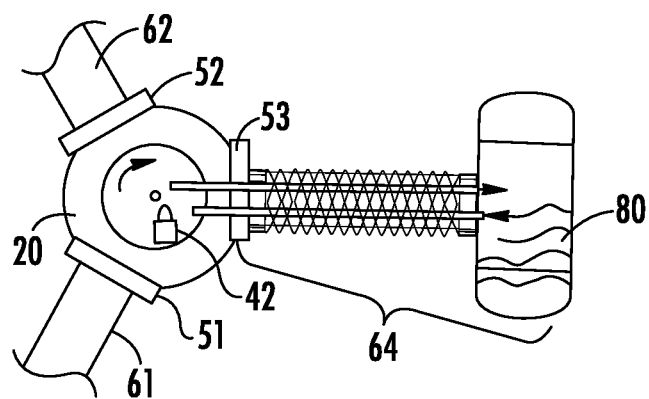

FIGS. 4 and 5 illustrate embodiments of a counterweight system 70 for individually mounting a rotor blade 22 on a balanced rotatable hub 20 of a wind turbine 10. The rotatable hub 20 can be mounted to a nacelle 16, and can have at least one blade root region 51, 52, 53 configured to receive a blade root of the rotor blade 22. The rotatable hub 20 can also have a pitch system 48 configured to rotate the rotor blade 22 and counterweight system 70 around a pitch axis 50. The counterweight system 70 can have at least one support structure 72 having a proximal end 74 spaced apart from a distal end 76, the proximal end 74 mountable to at least one blade root region 51, 52, 53 of the rotatable hub 20. At least one counterweight mass 78 can be at least partially filled with fluid 80, the counterweight mass 78 being coupled to the distal end 76 of the support structure 72. The support structure 72 can be arranged substantially parallel to the pitch axis 50 such that the pitch system 48 can rotate the counterweight mass 78 about the pitch axis 50.

When the pitch system 48 rotates the counterweight mass 78 about the pitch axis 50, the centroid 82 of the counterweight mass 78 can be varied in a radial direction R, caused by repositioning the fluid 80 or solid mass of the counterweight mass 78 as it rotates about the pitch axis 50, which changes the length of a counterweight mass moment arm M about the axial centerline of the rotatable hub 56, and thus the torque on the rotatable hub 20. Since the axial centerline 58 of the counterweight mass 78 is not perpendicular to the pitch axis 50, and is instead positioned at an angle theta (θ) with respect to the pitch axis 50, pitch rotation of the counterweight mass 78, and any fluid or solid mass therein, will incrementally vary the torque on the rotatable hub 20 with the counterweight system 70 in any angular rotor position, including horizontal. The angle theta (θ) is generally a fixed angle in the range of about 30 degrees to about 89 degrees, which delivers non-perpendicular rotation of the counterweight mass centroid 82 about the pitch axis 50. Pitch rotation of the counterweight mass 78 allows for small increments of torque to be added or removed from the rotatable hub 56 for 'fine-tuning' the hub position while mounting blades and counterweight systems as well as positioning the openings 46 in the rotor locking disc 40 for locking the rotor with the rotor lock 42. A fluid pumping system 86 can be provided for at least partially filling and emptying the at least one counterweight mass 78. The overall shape of the counterweight mass 78 can be at least one of round, cylindrical, square, rectangular, elliptical, and combinations thereof.

Another structural configuration of a counterweight system 70 that can provide variable torque on the rotatable hub 20 during pitch rotation is to subdivide the counterweight mass 78 into individually fluid-fillable portions 84 or solid mass portions 84, and combinations thereof, that are positioned at different distances from the axial centerline of the rotatable hub 56, and progressively at least partially filling and emptying the individually fluid-fillable portions 84 until the desired rotor balance and position is obtained. A fluid pumping system 86 can be provided for at least partially filling and emptying the at least one counterweight mass 78 fluid-fillable portions 84. Also, with the rotatable hub 20 configured to rotate a plurality of blades 22, and with the counterweight mass 78 substantially equal to the mass of one blade 22, each counterweight system can simulate the behavior of a single blade 22 mounted to the rotatable hub 20.

A structural configuration that can provide variable torque on the rotatable hub 20, without pitch rotation, can be provided by constructing the support structure 72 to be at least partially telescopic such that the distance between the proximate 74 and distal ends 76 of the support structure 72 can be changed. This will move the axial centerline 58 of the counterweight mass 78 in a radial direction R to vary the torque on the rotatable hub 20. It should be appreciated that the variable-torque effect provided by adjusting the distance between the proximate 74 and distal ends 76 of the support structure 72 can be accomplished in many ways, such as coupling the counterweight mass 78 to a rail system that allows the counterweight mass 78 to be controllably positioned along the length of the support structure 72. It should also be appreciated that the counterweight system 70 disclosed herein can be used on either a gearbox driven wind turbine or a direct drive wind turbine, as well as on any equipment having a rotatable hub with removable attachments.

FIGS. 6-16 illustrate a method of individually mounting at least one blade 61, 62, 63 to a balanced rotatable hub 20 of a wind turbine 10 using at least one counterweight system 64, 66 and a removable fluid 80, wherein the at least one counterweight system 64, 66 is mounted to at least one blade root region 51, 52, 53 of the rotatable hub 20 having a pitch system 48. The method steps can include: engaging a rotor lock 42 to stop rotation of a balanced rotatable hub 20 and installing a first blade 61 onto a first blade root region 51 of the balanced rotatable hub 20, the first blade 61 positioned in a horizontal direction (see FIG. 6); then disengaging the rotor lock 42 so that the rotor freely rotates the rotatable hub 20 to position the first blade 61 in a vertical downward direction (see FIG. 7); then installing a first counterweight system 64 onto a third blade root region 53 of the rotatable hub 20, the first counterweight system 64 containing no fluid (see FIG. 8); then installing a second counterweight system 66 onto a second blade root region 52 of the rotatable hub 20, the second counterweight system 66 containing no fluid (see FIG. 9); then at least partially filling the first counterweight system 64 with fluid 80 until the rotatable hub 20 becomes balanced and rotates a counterweight mass centroid 82 of the second counterweight system 66 past the vertical upward direction on the opposing side of the first blade 61 (see FIGS. 10 and 11); then at least partially filling the second counterweight system 66 with fluid while simultaneously emptying the first counterweight system 64 to rotate the balanced rotatable hub 20 until the second counterweight system 66 reaches a horizontal position.

Figure 16:
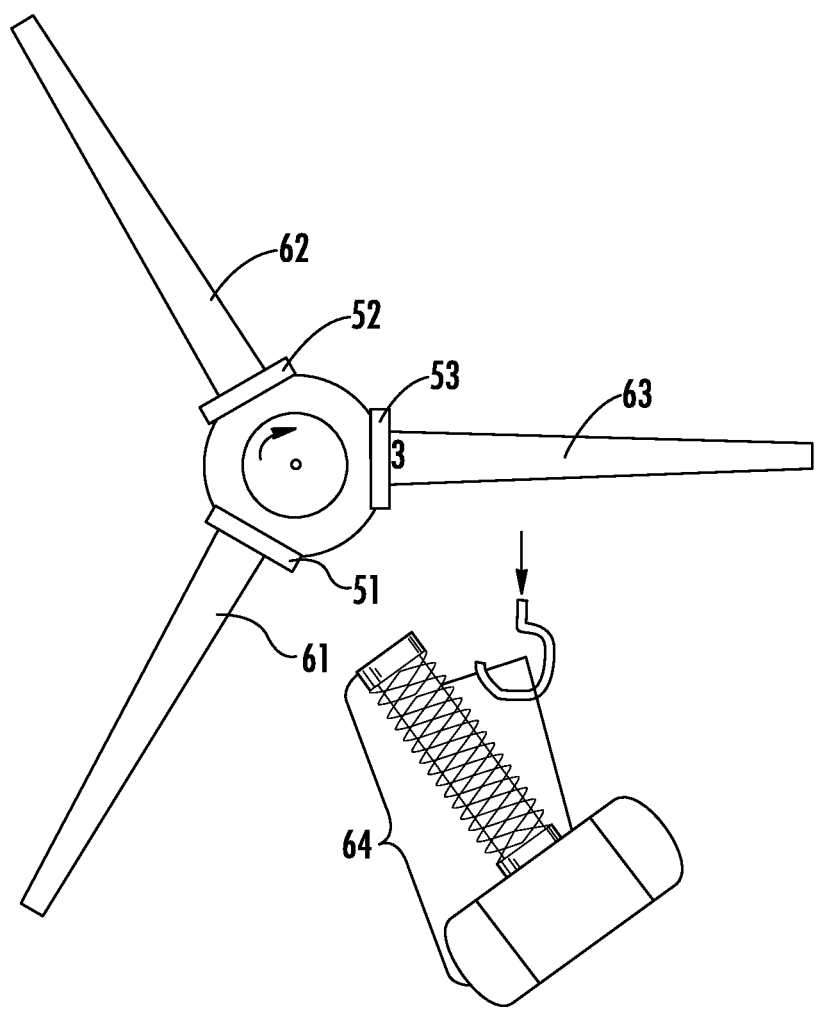

Additional method steps can be: engaging the rotor lock 42 to stop rotation of the balanced rotatable hub 20 (see FIG. 12); then uninstalling the second counterweight system 66 from the second blade root region 52, and installing a second blade 62 onto the empty second blade root region 52 of the rotatable hub, the second blade 62 positioned in a horizontal direction (see FIG. 13); then at least partially filling the first counterweight system 64 with fluid 80 until the rotatable hub 20 is balanced (i.e., when the mass of the first counterweight system 64 equals the mass of a blade 63) (see FIG. 14); then rotating the balanced rotatable hub 20 until the first counterweight system 64 is in a horizontal position and engaging the rotor lock 42 to stop rotation of the balanced rotatable hub 10 (see FIG. 15); then uninstalling the first counterweight system 64 from the third blade root region 53, and installing a third blade 63 onto the empty third blade root region 53 of the rotatable hub 20, the third blade 63 positioned in a horizontal direction, and then disengaging the rotor lock 42 so that the balanced rotor is free to rotate with all three blades 61, 62, 63 attached (see FIG. 16).

A method can also include; operating the pitch system 48 to rotate at least one of the first and second counterweight systems 64, 66 about a pitch axis 50 to vary at least one counterweight mass 78 centroid 82 in the radial direction R ,thereby changing the length of a counterweight mass moment arm M about the axial centerline of the rotatable hub 56, thereby positioning the balanced rotatable hub 20 for mounting and locking. Additional method steps can also include; operating a fluid pumping system 86 to fill and empty the first and second counterweight systems 64, 66; and operating the at least partially telescopic support structure 72 such that a distance between the proximate 74 and distal ends 76 of the support structure 72 is changed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A counterweight system for mounting a rotor blade on a balanced rotatable hub of a wind turbine, the rotatable hub mounted to a nacelle and having at least one blade root region configured to receive a blade root of the rotor blade, and a pitch system configured to rotate the rotor blade around a pitch axis, the counterweight system comprising:

at least one support structure comprising a proximal end spaced apart from a distal end, the proximal end mountable to at least one blade root region of the rotatable hub; and at least one counterweight mass coupled to the distal end of the at least one support structure, the at least one support structure arranged substantially parallel to the pitch axis such that the pitch system rotates the counterweight mass about the pitch axis, and, wherein a centroid of the at least one counterweight mass is varied in a radial direction, as the counterweight mass rotates about the pitch axis, to change the length of a counterweight mass moment arm about an axial centerline of the rotatable hub, wherein an axial centerline of the counterweight mass is positioned at an angle with respect to the pitch axis, the angle being greater 0 degrees and less than 90 degrees.

2. The counterweight system of claim 1, wherein an overall shape of the counterweight mass is at least one of round, cylindrical, square, rectangular, elliptical, and combinations thereof.

3. The counterweight system of claim 1, wherein an axial centerline of the at least one counterweight mass is non-perpendicular to the pitch axis.

4. The counterweight system of claim 1, wherein the counterweight mass is subdivided into at least one of individually fluid-fillable portions or solid mass portions and combinations thereof.

5. The counterweight system of claim 1, wherein the rotatable hub is configured to rotate a plurality of blades, and wherein the product of the counterweight mass times the counterweight mass moment arm is substantially equal to the product of the mass of a single blade times the blade moment arm.

6. The counterweight system of claim 1, wherein the support structure is at least partially telescopic such that a distance between the proximate and distal ends of the support structure can be changed.

7. The counterweight system of claim 1, wherein the at least one counterweight mass is at least partially fluid-fillable.

8. The counterweight system of claim 7, further comprising a fluid pumping system for at least partially filling and emptying the at least one counterweight mass.

9. The counterweight system of claim 1, wherein the wind turbine is one of a gearbox driven wind turbine or a direct drive wind turbine.

10. A wind turbine, comprising;
a tower;
a nacelle mounted atop the tower;
a generator coupled to a main frame within the nacelle; and
a counterweight system for mounting a rotor blade on a balanced rotatable hub of the wind turbine, the rotatable hub mounted to the nacelle and having at least one blade root region configured to receive a blade root of the rotor blade, and a pitch system configured to rotate the rotor blade around a pitch axis, the counterweight system comprising:
at least one support structure comprising a proximal end spaced apart from a distal end, the proximal end mountable to the at least one blade root region of the rotatable hub; and,
at least one counterweight mass coupled to the distal end of the at least one support structure, the at least one support structure arranged substantially parallel to the pitch axis such that the pitch system rotates the counterweight mass about the pitch axis, wherein a centroid of the at least one counterweight mass is varied in a radial direction as the counterweight mass rotates about the pitch axis to adjust the length of a counterweight mass moment arm about the axial centerline of the rotatable hub, and wherein an axial centerline of the counterweight mass is positioned at an angle with respect to the pitch axis, the angle being greater 0 degrees and less than 90 degrees.

11. The wind turbine of claim 10, wherein an overall shape of the counterweight mass is at least one of round, cylindrical, square, rectangular, elliptical, and combinations thereof.

12. The wind turbine of claim 11, wherein the axial centerline of the at least one counterweight mass is non-perpendicular to the pitch axis.

13. The wind turbine of claim 10, wherein the counterweight mass is subdivided into at least one of individually fluid-fillable portions or solid mass portions and combinations thereof.

14. The wind turbine of claim 10, wherein the rotatable hub is configured to rotate a plurality of blades, and wherein the product of the counterweight mass times the counterweight mass moment arm is substantially equal to the product of the mass of a single blade times the blade moment arm.

15. The wind turbine of claim 10, wherein the support structure is at least partially telescopic such that a distance between the proximate and distal ends of the support structure can be varied.

16. The wind turbine of claim 10, wherein the at least one counterweight mass is at least partially fluid-fillable, and wherein the wind turbine further comprises a fluid pumping system for at least partially filling and emptying the at least one counterweight mass.

\* \* \* \* \*